United States Patent [19]

Dixon

[11] 4,441,852

[45] Apr. 10, 1984

[54] PARTS HANDLING MACHINE

[75] Inventor: Paul H. Dixon, Belvidere, Ill.

[73] Assignee: Dixon Automatic Tool, Inc., Rockford, Ill.

[21] Appl. No.: 306,205

[22] Filed: Sep. 28, 1981

[51] Int. Cl.³ .................................... B65G 65/02
[52] U.S. Cl. ................................. 414/733; 414/917; 414/222; 414/753; 198/486
[58] Field of Search .............................. 414/749–753, 414/707, 728, 917, 233, 222; 100/207; 72/426; 74/54; 198/486, 488; 144/32; 29/211 R

[56] References Cited

U.S. PATENT DOCUMENTS

| | | | |
|---|---|---|---|
| 1,766,573 | 6/1930 | Westin | 414/733 |
| 2,674,386 | 4/1954 | Larson | 414/917 X |
| 2,811,266 | 10/1957 | Udal | 414/733 |
| 2,867,185 | 1/1959 | Hayward | 414/733 X |
| 3,061,118 | 10/1962 | Halberstadt | 414/917 X |
| 3,175,702 | 3/1965 | Banyas | 414/733 |
| 3,255,893 | 6/1966 | Hainer et al. | 414/728 |
| 3,929,176 | 12/1975 | Dixon | 144/32 |
| 4,002,247 | 1/1977 | Dixon | 214/1 |

Primary Examiner—Robert J. Spar
Assistant Examiner—Terrance L. Siemens
Attorney, Agent, or Firm—Leydig, Voit, Osann, Mayer & Holt, Ltd.

[57] ABSTRACT

A gripping mechanism having jaws for picking up and releasing parts is carried on an outwardly and inwardly swinging parallel linkage which, in turn, is mounted on an upwardly and downwardly swinging parallel linkage. A spring-loaded snubber takes out play in the linkages to insure precise positioning of the gripping mechanism at the ends of its outward and inward strokes. The jaws of the gripping mechanism are open and closed by a compactly mounted fluid-operated actuator, are connected to one another by an equalizing link which effects automatic self-centering of the jaws, are adapted to rotate the part as the part is transferred, and are adapted to be opened and closed with either a swinging motion or a straight line motion.

10 Claims, 18 Drawing Figures fig. 12.

PARTS HANDLING MACHINE

BACKGROUND OF THE INVENTION

This invention relates to a machine for handling parts. More particularly, the invention relates to a machine having a gripping mechanism with a pair of opposed jaws adapted to move between closed and open positions to pick up and release a part.

In the machine of the invention, the gripping mechanism is adapted to be moved back and forth along a path which is in the shape of an inverted U. That is, the gripping mechanism moves upwardly from a loading station with a part between the jaws, moves outwardly to shift the part from the loading station toward a delivery station, and then moves downwardly to place the part in the delivery station. Thereafter, the jaws open to release the part and then the gripping mechanism is moved upwardly, inwardly and downwardly to pick up another part at the loading station. By virtue of the gripping mechanism moving through an inverted U-shaped path, each part is positively picked up with an upward vertical motion at the loading station and then is positively placed with a downward vertical motion at the delivery station.

SUMMARY OF THE INVENTION

One of the aims of the present invention is to mount the gripping mechanism for movement along an inverted U-shaped path with apparatus which is relatively simple in construction, which is comparatively smooth and quiet in operation and which, at the same time, locates the gripping mechanism precisely at the same position in the loading and delivery stations during each cycle in spite of normal manufacturing tolerances which otherwise might cause variances in the repeatability of the motion. In carrying out the invention, the mounting apparatus comprises a first parallel linkage which is adapted to be shifted by a first actuator to move the gripping mechanism upwardly and downwardly. The gripping mechanism is mounted on a second parallel linkage which, in turn, is carried on the first linkage and is adapted to be shifted by a second actuator to move the gripping mechanism outwardly and inwardly. To insure precise repeatability, a spring-loaded snubber acts on the second linkage and uniquely biases the gripping mechanism outwardly at the delivery station while biasing the gripping mechanism inwardly at the loading station. By virtue of its novel action, the snubber takes out all of the play which manufacturing tolerances normally create in the outward-inward linkage and the outward-inward actuator and thus causes the gripping mechanism to stroke to exactly the same position in each station during each operating cycle.

A further object of the invention is to provide mechanism which acts on the up-down linkage to resist the force of gravity as the linkage moves downwardly and then to help the up-down actuator overcome gravity in moving the linkage upwardly, thereby to promote uniformity in the up-down movement.

An important object of the invention is to provide a relatively simple gripping mechanism whose jaws are uniquely mounted and actuated so that, in spite of manufacturing tolerances, the jaws are precisely and automatically self-centered on the part each time the jaws close. The gripping mechanism also is characterized by the novel and compact mounting of its actuator, by its ability to be easily adapted to rotate the part either clockwise or counterclockwise as the part is transferred, and by its ability to be adapted to either move the jaws between their open and closed positions with a swinging motion or to open and close the jaws with a straight line motion.

These and other objects and advantages of the invention will become more apparent from the following detailed description when taken in conjunction with the accompanying drawings.

DETAILED DESCRIPTION OF THE PREFERRED EMBODIMENTS

As shown in the drawings for purposes of illustration, the invention is embodied in a machine 20 for picking up, transferring and placing parts 21. While the machine may handle parts of various types, the specific parts which have been illustrated in FIGS. 1 to 11 are washers each having a tab 22 depending from one side thereof. The parts 21 are adapted to be advanced single file along a track (not shown) to a loading station 23 where each part is momentarily stopped. The part in the loading station then is picked up by the machine, is transferred outwardly, and is placed in a fixture 24 in a delivery station 25. Another part such as a fastener (not shown) may be assembled with the part 21 while the latter is held in the fixture.

The parts 21 are adapted to be transferred by a gripping mechanism 26 having a pair of opposing jaws 27 and 28 (FIG. 3) which are adapted to be moved between closed and open positions to grip and release each part. Herein, the gripping mechanism moves along an inverted U-shaped path as the gripping mechanism shifts back and forth between the loading and delivery stations 23 and 25. Specifically, the jaws close upon a part 21 in the loading station 23 as shown in solid lines in FIG. 1 and then the gripping mechanism is shifted upwardly along a vertical path to positively lift the part from the track. After being shifted upwardly to the position shown in phantom lines in FIG. 1, the gripping mechanism is moved horizontally and outwardly to the position shown in phantom lines in FIG. 2 in order to move the part toward the delivery station 25 and to locate the part above the fixture 24. Thereafter, the gripping mechanism moves downwardly along a vertical path to place the part in the fixture with a positive vertical motion (see the solid line position shown in FIG. 2). After the jaws have been opened to release the part, the gripping mechanism is shifted vertically upwardly, then horizontally inwardly and then vertically downwardly to cause the jaws to move into straddling relation with the next part in the loading station preparatory to the jaws closing and picking up that part.

In accordance with one aspect of the present invention, the parts gripping mechanism 26 is uniquely supported for movement along the inverted U-shaped path by a pair of parallel linkages 29 and 30, one of which causes the gripping mechanism to move upwardly and downwardly with a substantially vertical motion and the other of which causes the gripping mechanism to move outwardly and inwardly with a substantially horizontal motion. The parallel linkages are of relatively simple construction, are very quiet in operation and are capable of operating in a trouble-free manner over a long period of time.

More specifically, the parallel linkage 29 is mounted on a main support which herein is formed by a vertical column 31 and an underlying base 32. The linkage 29 includes an upper pair of laterally spaced links 33 and 34 (FIGS. 1 and 3) and a lower pair of laterally spaced links 35 and 36, the links of each pair being secured rigidly to one another and having inner end portions which straddle the column. Vertically spaced pins 37 extend through the column and the inner end portions of the links 33 to 36 and support bearings 38 which mount the links for upward and downward swinging about horizontal axes.

Figures 3, 4, 5:
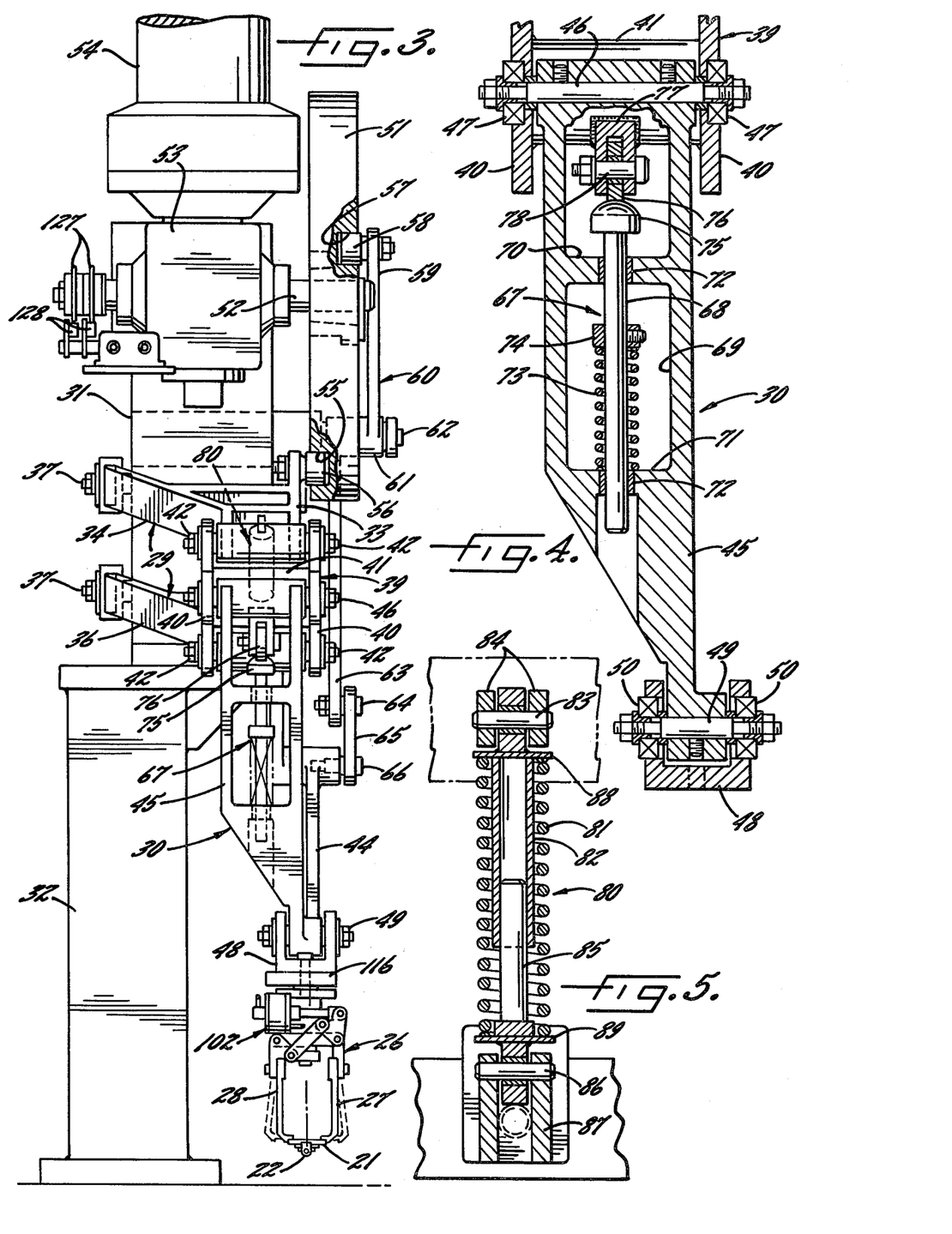
FIG. 3 is a front elevational view of the machine shown in FIG. 1.
FIGS. 4 and 5 are enlarged fragmentary cross-sections taken substantially along the lines 4—4 and 5—5, respectively, of FIG. 1.

At their outer ends, the links 33 to 36 are supported by a connector or spider 39 which is formed by two laterally spaced plates 40 secured rigidly to one another by a laterally extending tube 41 (FIG. 4). Vertically spaced pins 42 extend through the spider 39 and the outer end portions of the links 33 to 36 and carry bearings 43 which pivotally mount the links on the spider. The vertical spacing between the pins 42 is equal to the vertical spacing between the pins 37 and thus the upper links 33 and 34 extend parallel to the lower links 35 and 36. As the links 33 to 36 swing upwardly and downwardly about the axes of the pins 37, the spider 39 pivots about the axes of the pins 42 and maintains a substantially constant angular orientation.

The spider 39 also supports the parallel linkage 30. In the present instance, that linkage comprises an inner link 44 and an outer link 45 having upper end portions which are pivotally connected to the spider by horizontal pins 46 and bearings 47 (see FIG. 4). The two pins 46 are spaced horizontally from one another and are spaced ninety degrees from the pins 42. Thus, the pins 46 alternate with the pins 42 around the spider.

At their lower ends, the links 44 and 45 are connected pivotally to a U-shaped bracket 48 (FIGS. 1 and 3) which, in turn, supports the gripping mechanism 26. The links 44 and 45 are connected pivotally to the bracket by horizontally spaced and horizontally extending pins 49 (FIG. 4) and by bearings 50 which are supported on the pins. The horizontal spacing between the pins 49 is equal to the horizontal spacing between the pins 46 and thus the links 44 and 45 extend parallel to one another. As the links 44 and 45 pivot outwardly and inwardly about the axes of the pins 46, the gripping mechanism 26 pivots about the axes of the pins 49 and moves along a substantially horizontal path while maintaining a substantially constant orientation.

To effect swinging of the linkages 29 and 30, a rotatable cam 51 (FIGS. 1 and 3) is mounted on the drive shaft 52 of a speed reducer 53 which is attached to the column 31 and which is adapted to be driven by an electric motor 54. A cam track 55 is formed in one side of the cam and receives a cam follower or roller 56 which is rotatably mounted on the upper link 33 of the linkage 29. Another cam track 57 is formed in the opposite side of the cam and receives a roller 58 which is rotatably mounted on the upper arm 59 of a bellcrank lever 60 having an intermediate hub 61 connected pivotally to the column 31 at 62. The lower arm 63 of the bellcrank is pivotally connected at 64 to the inner end of a drive link 65 whose outer end is pivotally connected at 66 to the inner link 44 of the linkage 30. The cam track 55 and the roller 56 form an actuator for the linkage 29 while the cam track 57, the roller 58, the bellcrank 60 and the drive link 65 form an actuator for the linkage 30. When the cam 51 is rotated, the cam track 55 acts on the roller 56 to swing the linkage 29 upwardly and downwardly about the pins 37. In addition, the cam track 57 acts through the roller 58, the bellcrank 60 and the drive link 65 to cause the linkage 30 to swing inwardly and outwardly about the pins 46.

The two cam tracks 55 and 57 are shaped so as to cause the linkages 29 and 30 to swing in timed relation with one another and produce the requisite motion to shift the gripping mechanism 26 back and forth between the loading and delivery stations 23 and 25 along the inverted U-shaped path. Moreover, the cam tracks are shaped such that, as the linkage 29 is swung vertically to raise and lower the gripping mechanism, the linkage 30 is swung horizontally back and forth through a short distance to compensate for the arc through which the linkage 29 swings and to cause the gripping mechanism to raise and lower along virtually a straight vertical path. When the linkage 30 is swung horizontally to shift the gripping mechanism outwardly or inwardly, a slight up and down swinging movement is imparted to the linkage 29 to compensate for the swing arc of the linkage 30 and to cause the gripping mechanism to shift outwardly and inwardly along a virtually straight horizontal path.

Specifically, as the linkage 29 initially is swung upwardly to raise the gripping mechanism 26 from the loading station 23, the cam track 57 causes the linkage 30 to swing inwardly through a short distance until the linkage 29 reaches a horizontal position. Thereafter, the linkage 30 is swung outwardly through a short distance until the linkage 29 approaches the end of its upward stroke. Such slight inward and outward swinging of the linkage 30 "flattens" the arc imparted to the gripping mechanism 26 by the linkage 29 and causes the gripping mechanism to be lifted vertically upwardly.

As the linkage 29 approaches the end of its upward stroke, outward swinging of the linkage 30 is accelerated to move the gripping mechanism 26 toward the delivery station 25. During such movement, upward swinging of the linkage 29 is continued at a slow rate until the linkage 30 reaches a vertical position. The linkage 29 then is swung downwardly at a slow rate until the linkage 30 approaches the end of its outward stroke. Thus, the upward and downward swinging of the linkage 29 during outward swinging of the linkage 30 flattens the arc imparted to the gripping mechanism 26 by the linkage 30 and causes the gripping mechanism to be shifted outwardly with virtually straight horizontal motion.

The linkage 30 decelerates as it approaches the end of its outward stroke and, at that time, the linkage 29 accelerates downwardly to lower the gripping mechanism 26 toward the delivery station 25. Inward swinging of the linkage 30 then is effected at a slow rate until the linkage 29 reaches a horizontal position, at which time the linkage 30 is swung outwardly at a slow rate as the linkage 29 proceeds downwardly. Accordingly, the arc which is imparted to the gripping mechanism 26 by the linkage 29 again is flattened to cause the gripping mechanism to move vertically downwardly into the delivery station.

On the return stroke of the gripping mechanism 26, similar simultaneous swinging of the linkages 29 and 30 is effected so that one linkage flattens the arc imparted to the gripping mechanism by the other linkage. Thus, the gripping mechanism moves with virtually straight line motion at all times.

The present invention contemplates the provision of a unique spring-loaded snubber 67 (FIGS. 1 and 4) for taking up any play in the outward-inward linkage 30 and for causing the linkage to shift the gripping mechanism 26 outwardly to exactly the same position each time the gripping mechanism moves to the delivery station 25 and to shift the gripping mechanism inwardly to exactly the same position each time the mechanism returns to the loading station 23. As a result of the snubber 67, precise repeatability in the positioning of the gripping mechanism is insured even though manufacturing tolerances in the parts of the linkage 30 inherently result in some looseness in the linkage.

As shown in FIG. 4, the snubber 67 is a spring mechanism comprising a plunger 68 which is disposed within an opening 69 in the outer link 45 of the linkage 30. The webs 70 and 71 span the opening and support bushings 72 which guide the plunger for up and down sliding within the link 45. A coil spring 73 is telescoped over the plunger and is compressed between the web 71 and a fixed collar 74 on the plunger, the spring thus urging the plunger upwardly. The extreme upper end of the plunger is defined by a generally hemispherical nose 75.

The nose 75 of the plunger 68 is adapted to bear against and ride along a reaction surface on the spider 39. Herein, the reaction surface is defined by the peripheral surface of a roller 76 (FIG. 4) which is rotatably supported on a bracket 77 by a horizontal bolt 78, the bracket being welded to and projecting outwardly and downwardly from the tube 41 of the spider 39. The roller 76 is disposed equidistantly between the lowermost pin 42 and the outermost pin 46 and is located outwardly of an arc extending between those pins and struck about the center of the tube 41.

Figure 1:
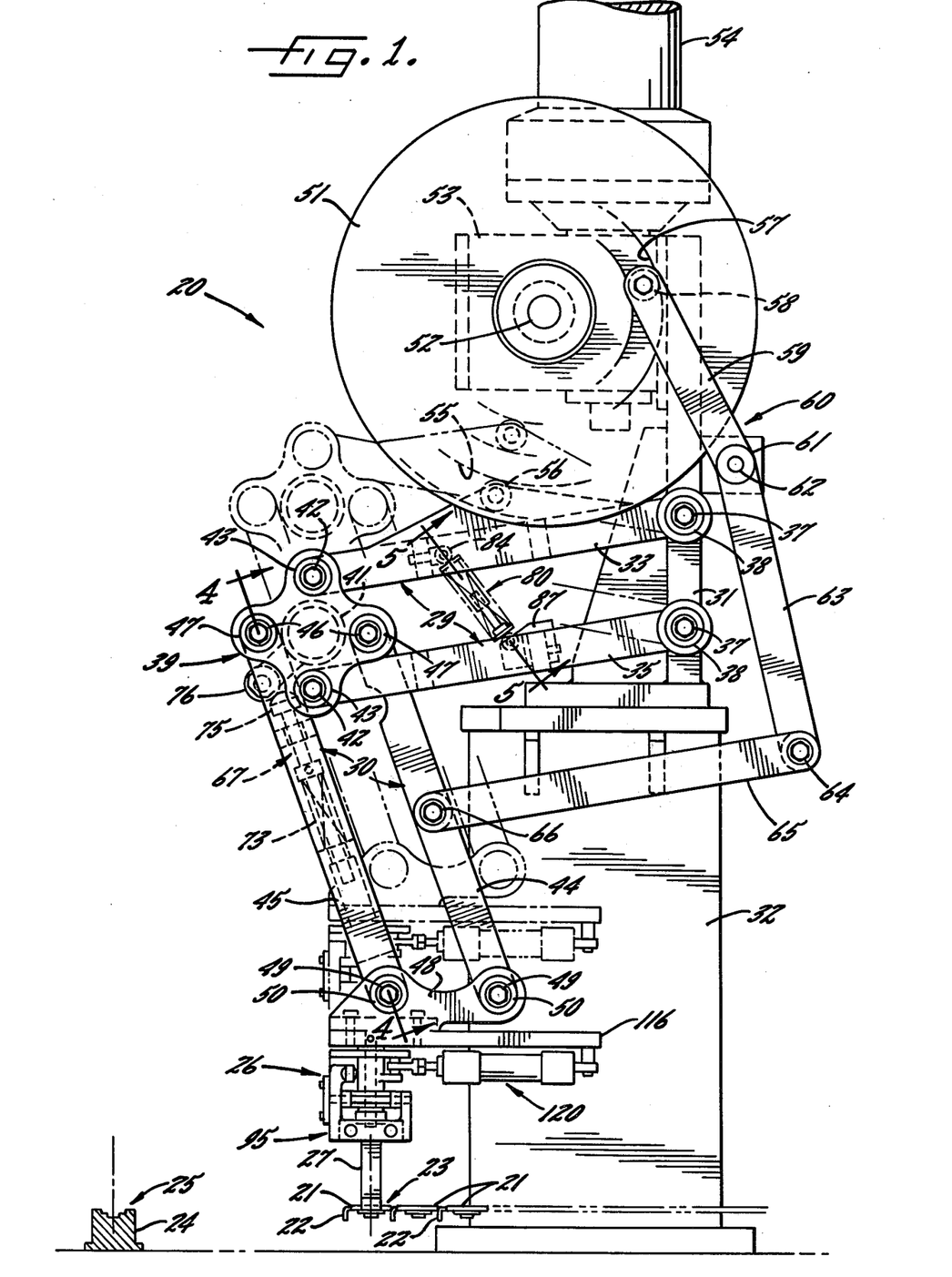
FIG. 1 is a side elevational view of one embodiment of a new and improved parts handling machine incorporating the unique features of the present invention.
Figure 2:
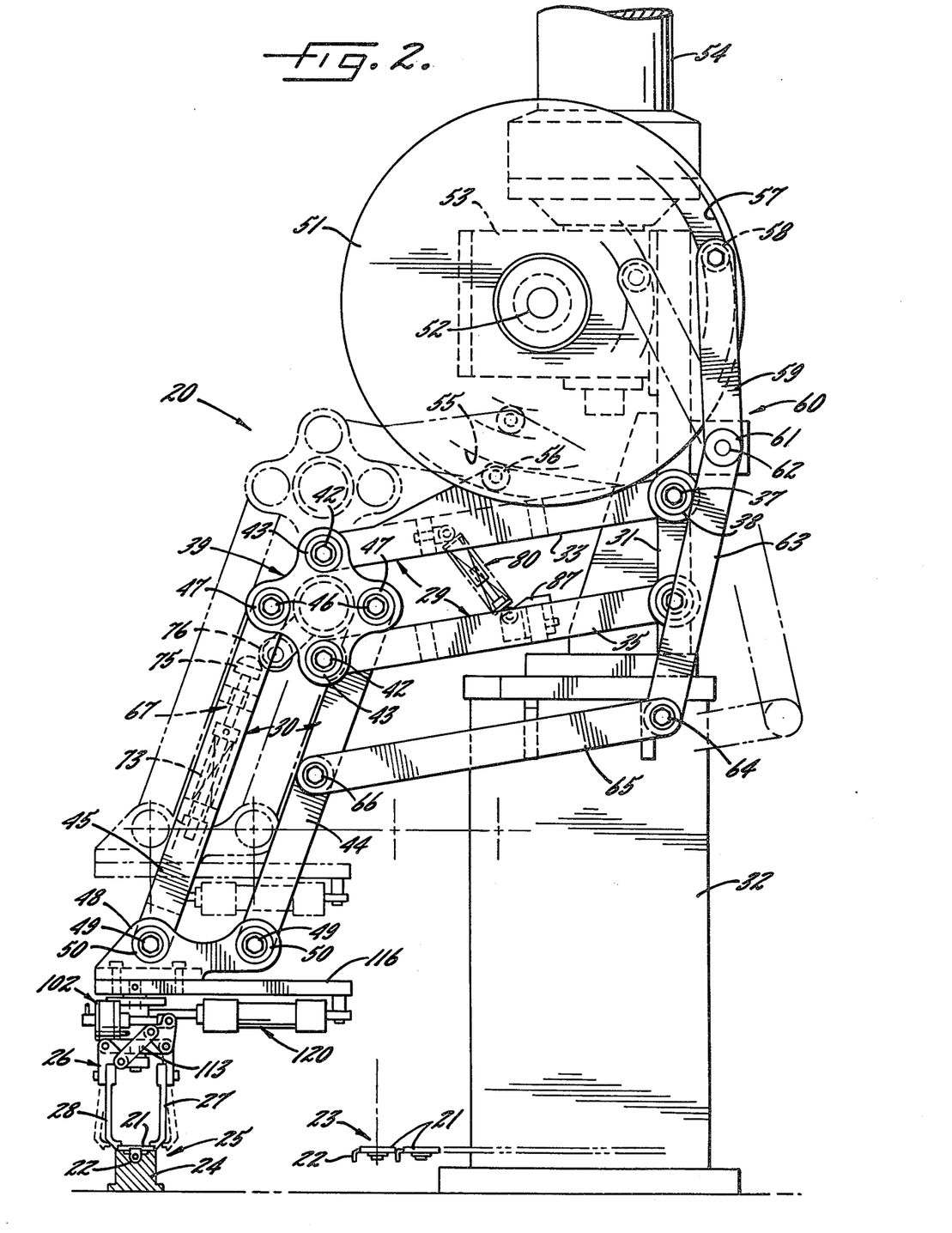
FIG. 2 is a side elevational view similar to FIG. 1 but shows certain parts of the machine in moved positions.

When the gripping mechanism 26 is retracted inwardly to the loading station 23 as shown in FIG. 1, the snubber 67 lies along a line which is disposed inwardly of a line extending between the center of the roller 76 and the center of the outermost pin 49. Thus, the spring 73 urges the spider 39 clockwise and, at the same time, urges the gripping mechanism 26 downwardly and inwardly to insure that the gripping mechanism is positioned at the full extreme of its inward stroke in spite of play which might exist at the various pivots 37, 42, 46 and 49. In addition, the spring force acts through the drive link 65 and the bellcrank 60 to keep the roller 58 positioned tightly against one side of the cam track 57. In other words, the snubber 67 takes out any play in the linkages 29 and 30 and also keeps the roller 58 biased tightly against one side of the cam track 57. As a result, the gripping mechanism 26 always moves through its full inward stroke and stops at exactly the same position in the loading station 23 each time the gripping mechanism is returned inwardly to that station.

As the gripping mechanism 26 is shifted outwardly, the nose 75 of the snubber 67 rides along the roller 76 and, as an incident thereto, the snubber swings across the line which extends between the center of the roller and the center of the outermost pin 49. When the gripping mechanism reaches the delivery station 25, the snubber lies along a line which is located outwardly of the line extending between the roller 76 and the outermost pin 49 (see FIG. 2). Accordingly, the spring 73 urges the spider 39 in a counterclockwise direction while urging the gripping mechanism 26 downwardly and outwardly to bias the gripping mechanism to the full extent of its outward stroke. Thus, the snubber again takes out the play in the linkages 29 and 30 and takes out the play between the roller 58 and the cam track 57 to insure that the gripping mechanism reaches exactly the same position in the delivery station 25 each time the gripping mechanism is shifted outwardly. As a result, precise repeatability is obtained during each cycle even though manufacturing tolerances make it virtually impossible to eliminate all play in the linkages 29 and 30 when the linkages are initially assembled.

Means 80 are provided for promoting uniform up and down motion of the gripping mechanism 26. Herein, these means comprise a coil spring 81 (FIG. 5) which acts to urge the upper links 33 and 34 away from the lower links 35 and 36. As shown in FIG. 5, the spring is telescoped over a plunger having a first element or sleeve 82 whose upper end is pivotally connected by a horizontal pin 83 to a bracket 84 located between and rigid with the upper links 33 and 34. The plunger further includes a second element or rod 85 telescoped slidably into the lower end of the sleeve 82, the lower end portion of the rod being pivotally connected by a pin 86 to a bracket 87 which is located between and is anchored to the lower links 35 and 36. The spring is compressed between a flange 88 on the upper end of the sleeve 82 and a flange 89 on the lower end of the rod 85 and thus serves to urge the upper links 33 and 34 away from the lower links 35 and 36.

When the cam track 55 starts to swing the upper linkage 29 downwardly, the relative pivoting which inherently occurs between the upper links 33 and 34 and the lower links 35 and 36 causes the spring 81 to compress and store energy. This tends to resist downward movement of the upper links and compensates for the weight thereof so that the cam 51 and the motor 54 do not race ahead as gravity pulls the links downwardly. When the links are shifted upwardly, the energy stored in the spring is released and assists the cam in overcoming gravity and raising the links. Accordingly, the spring 81 compensates for gravitational effects which otherwise tend to cause the linkage to lower rapidly and to raise sluggishly.

From the foregoing, it will be apparent that the present invention brings to the art a new and improved parts handling machine 20 in which the gripping mechanism 26 is supported for movement along an inverted U-shaped path by parallel linkages 29 and 30 which are of relatively simple and trouble-free construction. The snubber 67 insures precise repeatability in the inward and outward movement while the spring 81 promotes uniformity of the upward and downward movement. Because of the pivoted linkages 29 and 30 and the snubber 67, the gripping mechanism is shifted smoothly and in a very quiet manner.

In accordance with another aspect of the invention, the gripping mechanism 26 is of extremely simple and compact construction and operates with excellent preciseness and repeatability. The gripping mechanism is particularly characterized by the unique manner in which the jaws 27 and 28 are mounted and actuated so as to cause the jaws to automatically self-center on the parts 21 each time the jaws close.

Figures 6, 9:
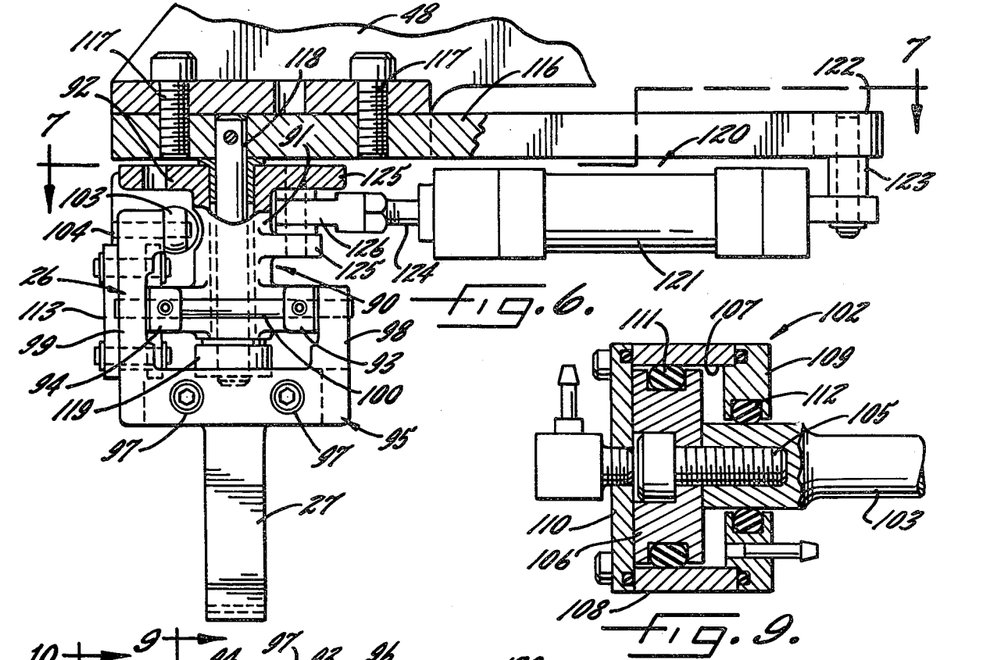
FIG. 6 is an enlarged side elevational view of the gripping mechanism of the machine shown in FIG. 1, certain parts being broken away and shown in cross-section.
FIG. 9 is an enlarged fragmentary cross-section taken substantially along the line 9—9 of FIG. 7.

As shown most clearly in FIG. 6, the gripping mechanism 26 comprises a main support 90 which herein is formed by a single-piece casting. The casting 90 includes a central sleeve 91, a plate 92 on the upper end of the sleeve, and inner and outer transversely extending bars 93 and 94 on the lower end portion of the sleeve.

The jaws 27 and 28 are carried by levers 95 and 96, respectively, (FIGS. 6 and 10) and are secured thereto by screws 97. The lever 95 is generally U-shaped as shown in FIG. 6 and includes inner and outer upstanding arms 98 and 99 which are pivotally mounted on a horizontal pin 100 extending between the end portions of the bars 93 and 94. The level 96 is similarly mounted on another horizontal pin 101 which extends between the opposite end portions of the bars. As the levers pivot about the pins 100 and 101, the jaws 27 and 28 swing between their open and closed positions (see FIGS. 10 and 11).

Pivoting of the lever 95 is effected by a fluid-operated actuator 102 (FIGS. 9 and 10) which, in accordance with the invention, is mounted in a novel manner so as to enable the actuator to be of simple and compact construction. Herein, the actuator comprises an elongated driver or rod 103 which is adapted to be reciprocated back and forth to pivot the lever 95 about its axis 100. One end of the rod is connected to the upper end of the leg 99 of the lever 95 by a horizontal pivot pin 104. The other end of the rod is connected by a screw 105 (FIG. 9) to a piston 106 which is telescoped slidably into a cylinder 107. In keeping with the invention, the cylinder includes a tubular sleeve 108 which is formed integrally with the casting and which thus is rigid with the casting. One end of the sleeve 108 is closed by an end plate 109 while the other end of the sleeve is closed by an end plate 110, the end plates being fastened to the sleeve by screws. The rod 103 extends slidably through the end plate 109.

A resiliently yieldable sealing element in the form of an O-ring 111 (FIG. 9) encircles the piston 106 and establishes a seal between the piston and the sleeve 108 of the cylinder 107. Another O-ring 112 encircles the rod 103 to establish a seal between the rod and the end plate 109.

When pressurized air is admitted into the head end of the cylinder 107, the rod 103 is advanced and pivots the lever 95 clockwise (FIG. 10) about the pin 100 to close the jaw 27. Conversely, the admission of pressurized air into the rod end of the cylinder retracts the rod to effect counterclockwise pivoting of the lever 95 and opening of the jaw. As the rod 103 reciprocates, it moves in a path which substantially parallels a line extending between the axes 100 and 101 of the levers 95 and 96 (see FIG. 10).

Because the lever 95 pivots about the axis 100, the pin 104 which connects the rod 103 to the lever swings in an arc about that axis as the rod reciprocates. It is necessary for the reciprocating rod to accommodate the swinging motion of the pin 104 and conventionally that accommodation would be effected by pivotally mounting the head end of the cylinder 107 on the body 90 of the gripping mechanism 26. In the present instance, however, the need for pivotally mounting the head end of the cylinder is eliminated so as to enable the overall arrangement of the actuator 102 to be more simple and compact. This is achieved by causing the rod 103 to reciprocate through a stroke whose midpoint is located substantially on a line extending through the axis 100 of the lever 95 and extending perpendicular to the rod so that the pin 104 is located the same distance from such line when the rod reaches the end of either its advance or retract stroke. In addition, the cylinder 107 is located such that the longitudinal centerline of the rod 103 is located midway of the vertical distance through which the pin 104 travels as the pin swings in an arc. With this arrangement, the distance through which the rod 103 must rock vertically in either direction to allow swinging of the pin 104 is relatively small and may be accommodated by the O-rings 111 and 112. Thus, as the rod 103 swings the pin 104 back and forth, the O-rings yield to allow the rod and the piston 106 to rock slightly within the end plate 109 and the sleeve 108, respectively, and thereby enable the rod to swing the pin without need of pivotally mounting the head end of the cylinder on the body 90.

Figure 10:
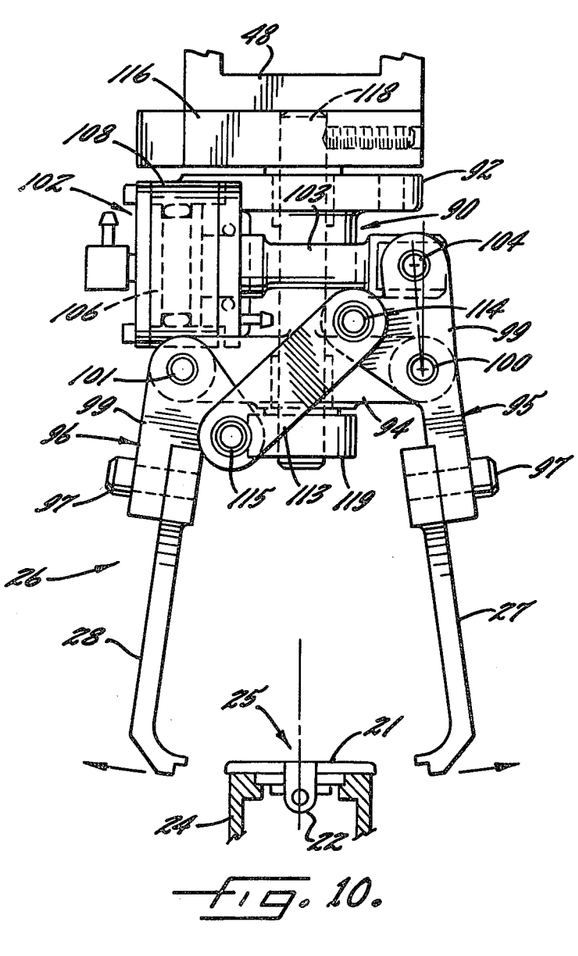
FIG. 10 is an enlarged fragmentary front elevational view of the parts gripping mechanism shown in FIG. 7, the view being taken along the line 10—10 of FIG. 7.
Figure 11:
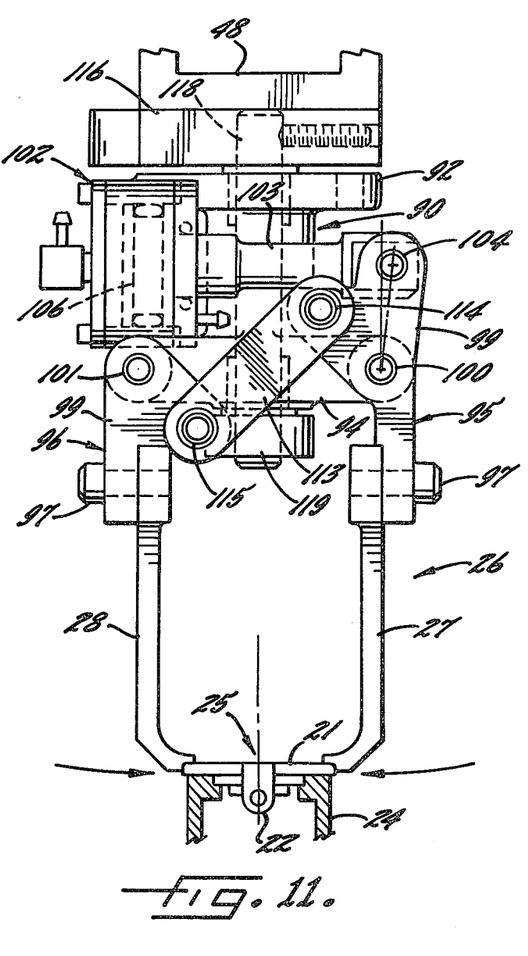
FIG. 11 is a view similar to FIG. 10 but shows certain parts of the gripping mechanism in moved positions.

To effect self-centering of the jaws 27 and 28, provision is made of an equalizing link 113 (FIG. 10) which causes the lever 96 to swing through exactly the same angular distance as the lever 95 when the latter is pivoted. As shown in FIG. 10, the equalizing link 113 is pivotally connected at one end to the lever 95 at 114 and is pivotally connected at its other end to the lever 96 at 115. The distance between the pivots 100 and 114 is equal to the distance between the pivots 101 and 115. As a result of the link 113, pivoting of the lever 95 in one direction through a predetermined angular distance about the axis 100 causes the lever 96 to turn through the same angular distance but in the opposite direction about the axis 101. The link causes any tolerances in the gripping mechanism 26 to cancel out and causes the jaws 27 and 28 to automatically center on the part 21 each time the jaws are closed. Thus, the jaws will close fully upon and tightly grip every part 21 even though the part might be slightly oversized or undersized.

The gripping mechanism 26 is capable of rotating each part 21 through ninety degrees as the gripping mechanism transfers the part from the loading station 23 to the delivery station 25. For this purpose, the main support or body 90 of the gripping mechanism is rotatably connected to an upper mounting member or plate 116 (FIG. 6) which, in turn, is connected to the bracket 48 of the linkage 30 by screws 117. The mounting plate 116 extends horizontally beneath the bracket 48 and supports a fixed, depending rod 118. The sleeve 91 of the body 90 of the gripping mechanism is rotatably mounted on the rod and thus the gripping mechanism is capable of rotating about a vertical axis relative to the mounting plate 116. The sleeve 91 is retained on the rod 118 by a lower thrust collar 119.

To effect rotation of the gripping mechanism 26, a fluid-operated actuator 120 (FIG. 6) is connected between the mounting plate 116 and the body 90 of the gripping mechanism. The actuator comprises a cylinder 121 located below the mounting plate 116 and having an inner end which is connected to a laterally extending ear 122 (FIG. 7) on the mounting plate by a vertical pivot pin 123. A reciprocating rod 124 is telescoped slidably into the cylinder and its outer end is located between two vertically spaced ears 125 (FIG. 6), the ears being formed integrally with the body 90 and projecting inwardly and laterally from the body. A vertical pin 126 extends through the ears 125 and the rod 124 to connect the rod pivotally to the body 90.

Figure 7:
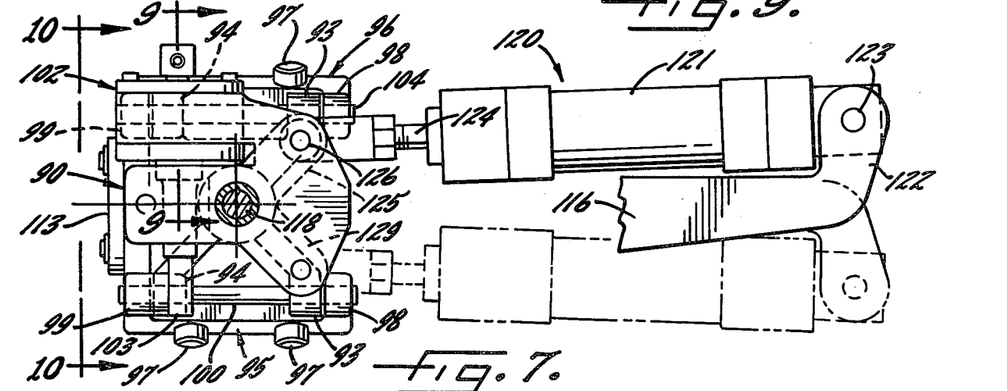
FIG. 7 is a cross-sectional view taken substantially along the line 7—7 of FIG. 6.
Figure 8:
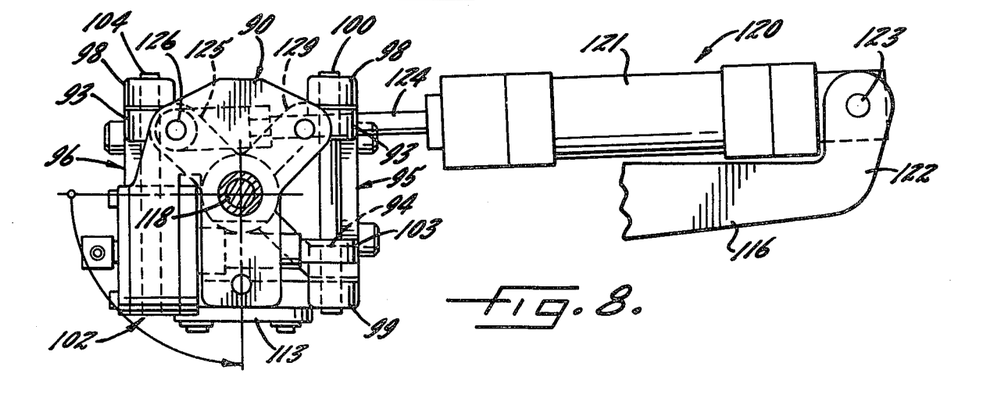
FIG. 8 is a view similar to FIG. 7 but shows certain parts in moved positions.

With the foregoing arrangement, the gripping mechanism 26 is rotated counterclockwise from the position shown in FIG. 7 to the position shown in FIG. 8 when the rod 124 of the actuator 120 is extended and is rotated clockwise when the rod is retracted. Thus, the gripping mechanism may initially be positioned in the loading station 23 with the jaws 27 and 28 facing laterally as shown in FIG. 1 to pick up a part 21 whose tab 22 faces outwardly. As the gripping mechanism is shifted outwardly, the rod 124 may be extended to rotate the gripping mechanism counterclockwise (FIG. 7) through ninety degrees and cause the jaws 27 and 28 and the part 21 to turn to the position shown in FIGS. 2, 10 and 11. The part 21 thus may be placed in the fixture 24 with the tab 22 facing laterally. As the gripping mechanism is returned to the loading station 23, the rod 124 is retracted in order to turn the jaws clockwise to the proper position to pick up the next part 21. The rod is adapted to be extended and retracted by pressurized air admitted alternately into opposite ends of the cylinder 121 of the actuator 120. Operation of the actuator 120 and also of the actuator 102 is effected in timed relation with the outward and inward shifting of the gripping mechanism 26 by means of cams 127 (FIG. 3) rotatable with the shaft 52 of the speed reducer 53 and operable to actuate microswitches 128 which control solenoid-operated valves (not shown) for the actuators.

Advantageously, the gripping mechanism 26 may be easily changed over so as to rotate the part 21 clockwise rather than counterclockwise as the part is shifted from the loading station 23 to the delivery station 25. This is achieved by forming two additional ears 129 (FIG. 7) on the body 90 of the gripping mechanism 126 for receiving the pivot pin 126 of the actuator rod 124. The ears 129 also extend inwardly from the body 90 but are spaced ninety degrees from the ears 125 and thus extend laterally from the body in a direction opposite to the ears 125. By connecting the rod 124 between the ears 129 and by inverting the mounting plate 116 on the bracket 48 such that the ear 122 of the mounting plate extends in the opposite lateral direction, the actuator 120 may be positioned as shown in phantom lines in FIG. 7 and will be capable of rotating the gripping mechanism 26 clockwise when the rod 124 is extended.

Another embodiment of a gripping mechanism 26' is shown in FIGS. 12 to 18 and incorporates most of the features of the gripping mechanism 26. Parts of the gripping mechanism 26' which correspond to parts of the gripping mechanism 26 have been indicated by the same but primed reference numerals. The gripping mechanism 26' is particularly characterized by jaws 27' and 28' which open and close with a straight line motion rather than a swinging motion.

Figure 13:
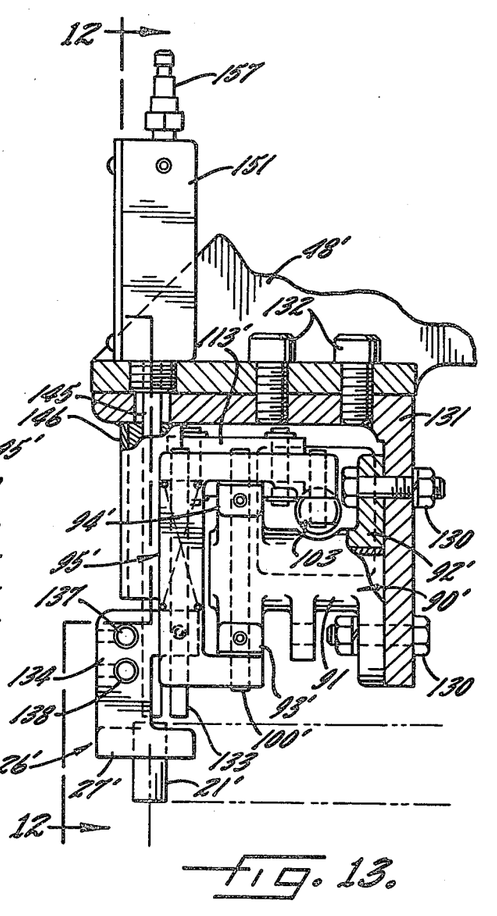
FIG. 13 is a side elevational view of the gripping mechanism shown in FIG. 12, certain parts being broken away and shown in section.
Figure 14:
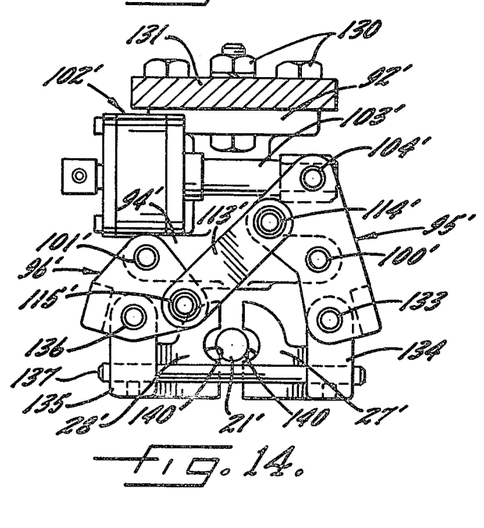
FIG. 14 is a top plan view of certain parts shown in FIGS. 12 and 13.

As shown most clearly in FIG. 13, the gripping mechanism 26' includes a main support or body 90' which is identical to the body 90. The body 90', however, is oriented with the sleeve 91' extending horizontally, with the plate 92' located at the inner end of the sleeve and with the bars 93' and 94' located at the outer end of the sleeve. The plate 92' is fastened by screws 130 to an inverted L-shaped bracket 131 which, in turn, is fastened by screws 132 to the mounting bracket 48'.

A generally U-shaped lever 95' which carries the jaw 27' is pivotally mounted on the body 90' by a vertical pin 100' (FIGS. 13 and 14) extending through the end portions of the bars 93' and 94'. Another pin 101' extends vertically through the opposite end portions of the bars and pivotally supports a second U-shaped lever 96' (FIG. 14) which carries the jaw 28'. An equalizer link 113' is pivotally connected at 114' and 115' to the levers 95' and 96', respectively, and causes the lever 96' to swing in the opposite direction from, but through the same angular distance as, the lever 95' when the latter lever is pivoted. To effect pivoting of the lever 95', the gripping mechanism 26' includes an actuator 102' which is identical to the actuator 102. The rod 103' of the actuator 102' is pivotally connected to the lever 95' at 104'.

A vertical pin 133 (FIGS. 12 and 13) is supported rotatably by the lever 95' and extends through a mounting ear 134 on the upper end portion of the jaw 27', the ear being fastened securely to the pin. Similarly, an ear 135 on the jaw 28' is fastened rigidly to a vertical pin 136 which is supported rotatably by the lever 96'. Thus, the jaws 27' and 28' are capable of turning relative to the levers 95' and 96' about the axes of the pins 133 and 136.

To cause the jaws 27' and 28' to open and close with straight line motion, upper and lower horizontal rods 137 and 138 (FIGS. 12 to 14) extend through the mounting ears 134 and 135 of the jaws. The rod 137 is fixed to the ear 134 of the jaw 27' and is slidable within the ear 135 of the jaw 28' while the rod 138 is fixed to the ear 135 and is slidable within the ear 134. With this arrangement, pivoting of the levers 95' and 96' to close the jaws 27' and 28' causes the jaws to move toward one another but, at the same time, the jaws turn relative to the levers about the axes of the pins 133 and 136 and are constrained for movement in a straight line by the rods 137 and 138.

It will be apparent from the foregoing that the same body 90, 90' and the same actuator 102, 102' may be used to open and close the jaws 27, 27' and 28, 28' with either swinging motion or straight line motion. Accordingly, the body and the actuator may be used universally with both of the gripping mechanisms 26 and 26'.

Figure 15:
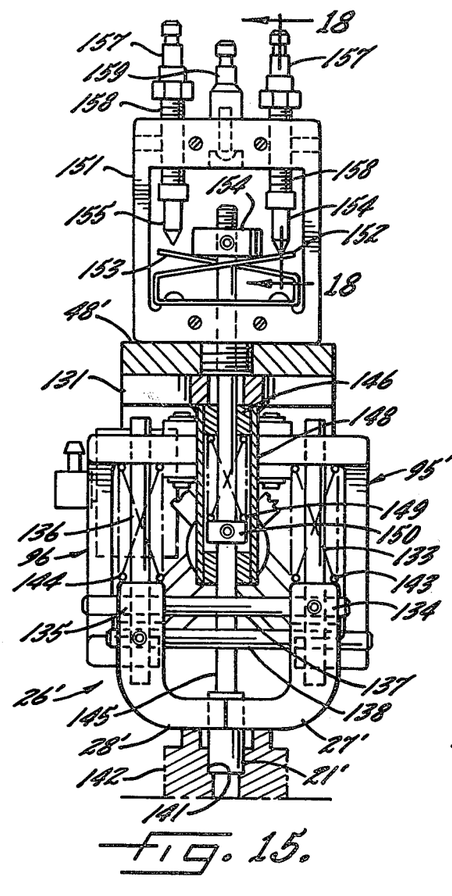
FIGS. 15, 16 and 17 are views similar to FIGS. 12, 13 and 14, respectively, but show certain parts of the gripping mechanism in moved positions.
Figure 16:
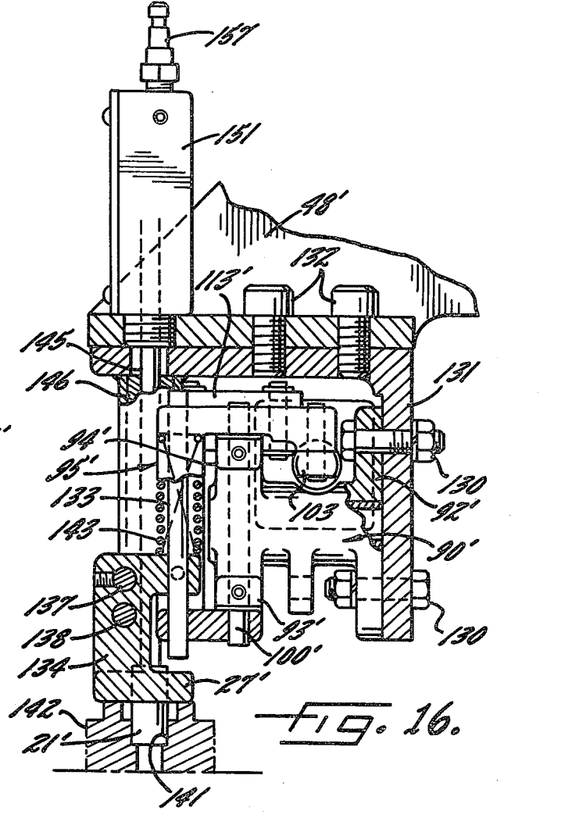
Figure 17:
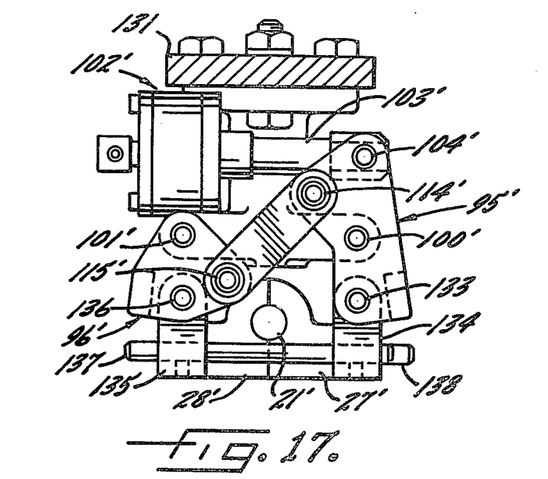
Figure 18:
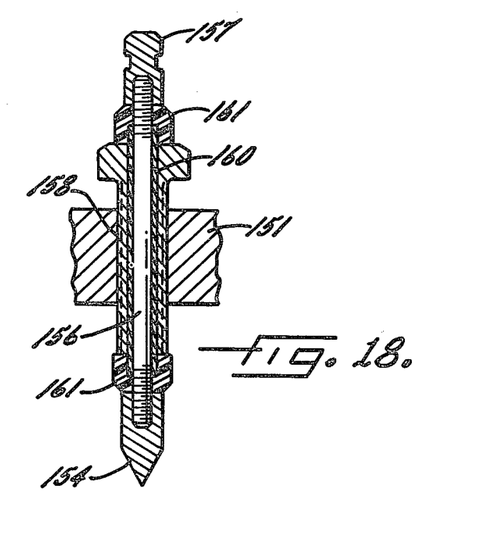
FIG. 18 is an enlarged fragmentary cross-section taken substantially along the line 18—18 of FIG. 15.

The straight line motion of the jaws 27' and 28' is advantageous when certain types of parts are to be picked up from certain types of tracks or are to be placed in certain locations. For example, the jaws 27' and 28' are formed with generally semi-circular notches 140 (FIG. 14) which are adapted to grip a part in the form of a cylindrical stud 21'. In the present instance, the stud is adapted to be inserted into a counterbored hole 141 (FIG. 15) in a workpiece 142 and is adapted to be seated against the bottom of the hole. When the stud is fully seated, the lower ends of the jaws engage the upper side of the workpiece as shown in FIGS. 15 and 16. The straight line motion of the jaws enable the jaws to clear the upper side of the workpiece 142 as the jaws open to release the stud.

The gripping mechanism 26' also has the ability to determine and signal whether the stud 21' has been properly placed in the workpiece 142, has been misplaced in the workpiece or has not been placed in the workpiece at all. In part, this is achieved by mounting the jaws 27' and 28' for up and down movement relative to the body 90' of the gripping mechanism. Thus, the ears 134 and 135 of the jaws 27' and 28' are mounted to slide upwardly and downwardly on the pins 133 and 136, respectively. Coil springs 143 and 144 (FIGS. 12 and 16) are telescoped over the pins 133 and 136 and are compressed between the ears and the levers 95' and 96'. Accordingly, the jaws are capable of moving upwardly and downwardly relative to the body 90' of the gripping mechanism and are biased in a downward direction by the springs 143 and 144.

To detect the presence or absence of the stud 21', and elongated inspection probe 145 (FIG. 12) is located between the jaws 27' and 28' and is adapted to move upwardly and downwardly relative thereto. The probe is in the form of an elongated rod which is guided slidably by upper and lower bushings 146 and 147 disposed within a sleeve 148 which is secured rigidly to the underside of the bracket 131. A coil spring 149 is telescoped over the probe 145 and is compressed between the upper bushing 146 and a lower collar 150, the collar being fixed to the probe. Thus, the spring 149 urges the probe downwardly relative to the jaws but permits the probe to slide upwardly within the bushings 146 and 147. The force exerted by the spring 149 is greater than the combined force exerted by the springs 143 and 144.

Figure 12:
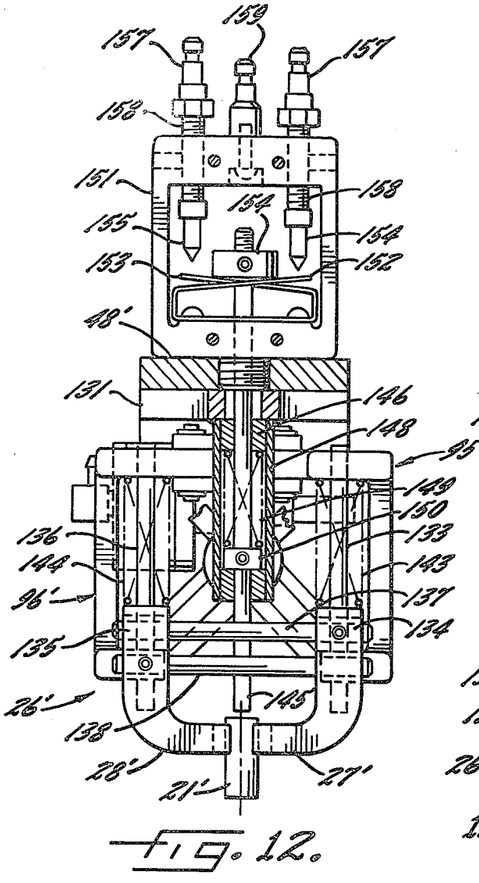
FIG. 12 is a front elevational view, partly in section, and showing another embodiment of a parts gripping mechanism incorporating the features of the invention, the view being taken substantially along the line 12—12 of FIG. 13.

The upper end portion of the probe 145 extends through the bracket 131 and extends into a housing 151 (FIGS. 12 and 13) which is secured to the upper side of the bracket 48'. Disposed within the housing are two switch contacts 152 and 153 (FIG. 12) which are in the form of cantilevered leaf springs secured to the housing and normally bearing against the underside of a collar 154 fixed to the upper end portion of the probe. Under certain conditions, the spring contacts 152 and 153 engage fixed contacts 154 and 155, respectively, to produce electrical signals. Each fixed contact is screwed onto the lower end of a threaded rod 156 (FIG. 18) having an electrical terminal 157 screwed onto its upper end. The rod 156 is disposed within an externally threaded sleeve 158 which is screwed into the upper end portion of the housing 151 and which may be adjusted upwardly and downwardly to change the elevation of the contacts 154, 155 relative to the spring contacts 152, 153. As shown in FIG. 12, the contact 154 is located at a slightly lower elevation than the contact 155.

A "ground" terminal 159 (FIG. 12) also is mounted on the upper end portion of the housing 151 and is conductively connected to the spring contacts 152 and 153 by the housing. Each of the contacts 154 and 155 is insulated electrically from the housing 151 by a non-conductive sleeve 160 (FIG. 18) and by non-conductive grommets 161.

To explain the operation of the inspection probe 145, let it be assumed that the jaws 27' and 28' are holding a stud 21' above the workpiece 142 and are just starting to move downwardly toward the workpiece (see FIGS. 12 and 13). When the jaws are in this position, the lower end of the probe 145 is spaced above the upper end of the stud, the lower collar 150 of the probe is in engagement with the lower bushing 147, and the upper collar 154 of the probe is located so as to hold the spring contacts 152 and 153 out of engagement with the contacts 154 and 155.

As the gripping mechanism 26' moves downwardly to place the stud 21' in the workpiece 142, the lower ends of the jaws 27' and 28' engage the upper side of the workpiece as shown in FIGS. 15 and 16. Assuming that a stud is present and is properly placed, such engagement occurs at about the same time the stud bottoms in the hole 141 in the workpiece. As a result of the jaws engaging the workpiece, further downward movement of the jaws is stopped. The brackets 48' and 131, the body 90' and the probe 145, however, continue to move downwardly in unison relative to the stopped jaws, such movement being permitted by the slidable pins 133 and 136 and by the springs 143 and 144. As the probe moves downwardly, its lower end contacts the upper end of the stud and is stopped as the brackets 48' and 131, the housing 151 and the body 90' continue to move downwardly as permitted by the spring 149 and the sliding fit between the probe and the bushings 146 and 147. As the housing 151 moves downwardly relative to the stopped probe 145, the upper collar 154 on the probe allows the spring contacts 152 and 153 to flex upwardly. If the stud 21' has been properly placed, the spring contact 152 engages the contact 154 to produce an electrical signal indicating correct placement (see FIG. 15).

If the stud 21' should happen to jam against the workpiece 142 or jam in the hole 141, the lower end of the probe 145 engages the upper end of the elevated stud sooner than in the case of a normally placed stud. As a result, the housing 151 moves downwardly relative to the probe through a greater distance than normal and enables the spring contact 153 to engage the contact 155. When both of the contacts 154 and 155 are closed, an electrical signal is produced to indicate that a jam has occurred and to indicate a possible machine malfunction producing a jam.

If the stud 21' is completely missing from the jaws 27' and 28', the probe 145 simply moves downwardly through the jaws after the jaws have stopped against the workpiece 142. Under these circumstances, there is no relative movement between the probe and the housing 151 and thus the spring contacts 152 and 153 are not permitted to engage the contacts 154 and 155. The absence of signals from both contacts 154 and 155 indicates that the stud is missing and is indicative of a possible machine malfunction causing studs not to be placed in the jaws or to be lost from the jaws.

I claim:

1. A parts handling machine comprising a support, gripping mechanism for selectively picking up and releasing a part, and means mounting said gripping mechanism on said support to move upwardly, then generally horizontally and thence downwardly, said mounting means comprising a first pair of generally horizontally extending and vertically spaced parallel links having inner end portions pivotally mounted on said support to swing upwardly and downwardly about generally horizontal axes, a second pair of generally vertically extending and horizontally spaced parallel links having lower end portions pivotally connected to said gripping mechanism to swing inwardly and outwardly about generally horizontal axes, a connector pivotally mounting the outer end portions of said first links to swing upwardly and downwardly about generally horizontal axes and pivotally mounting the upper end portions of said second links to swing inwardly and outwardly about generally horizontal axes, a reaction surface on said connector, spring mechanism carried by one of said second links, said spring mechanism having an upper end biased upwardly against said reaction surface and having a lower end portion acting through said one link to bias said gripping mechanism downwardly, the upper end of said spring mechanism riding along said reaction surface as said second links are swung inwardly and outwardly, said reaction surface being shaped and located so as to cause said spring mechanism to urge said gripping mechanism inwardly when said second links are at the end of their inward stroke and to urge said gripping mechanism outwardly when said second links are at the end of their outward stroke, a first actuator for swinging said first links upwardly and downwardly, and a second actuator for swinging said second links inwardly and outwardly in timed relation with the swinging of said first links.

2. A parts handling machine as defined in claim 1 in which said reaction surface comprises the peripheral surface of a roller supported on said connector to rotate about a generally horizontal axis, said roller being located on said connector between the pivot points of the outer end portion of the lowermost one of said first links and the upper end portion of the outermost one of said second links.

3. A parts handling machine as defined in either of claims 1 or 2 in which said spring mechanism comprises a plunger guided slidably by said one link and having an upper end disposed in engagement with said reaction surface, and a spring telescoped over said plunger and compressed between said plunger and said one link to bias the upper end of said plunger against said reaction surface and to bias said gripping mechanism downwardly.

4. A parts handling machine as defined in claim 1 further including a spring acting between the links of said first pair and urging such links away from one another.

5. A parts handling machine as defined in claim 4 further including a first element having an upper end portion pivotally connected to the uppermost one of said first links, a second element telescoped slidably with said first element and having a lower end portion pivotally connected to the lowermost one of said first links, said spring being telescoped over and compressed between said elements and urging said first and second elements upwardly and downwardly, respectively.

6. A parts handling machine comprising a support, gripping mechanism for selectively picking up and releasing a part, and means mounting said gripping mechanism on said support to move upwardly, then generally horizontally and thence downwardly, said mounting means comprising a first pair of generally horizontally extending and vertically spaced parallel links having inner end portions pivotally mounted on said support to swing upwardly and downwardly, a second pair of generally vertically extending and horizontally spaced parallel links having lower end portions pivotally connected to said gripping mechanism to swing inwardly and outwardly about generally horizontal axes, a connector pivotally mounting the outer end portions of said first links to swing upwardly and downwardly about generally horizontal axes and pivotally mounting the upper end portions of said second links to swing inwardly and outwardly about generally horizontal axes, actuating means for swinging said first links upwardly and downwardly, a rotatable cam, a linkage connected between said cam and said second links and operable to swing said second links inwardly and outwardly in response to rotation of said cam, a roller supported on said connector to rotate about a generally horizontal axis, said roller being located on said connector between the pivot points of the outer end portion of the lowermost first link and the upper end portion of one of said second links, a spring mechanism carried by said one link, said spring mechanism having an upper end biased against said roller and riding along said roller as said second links are swung inwardly and outwardly, and said spring mechanism having a lower end portion acting through said one link to urge said gripping mechanism inwardly when said second links are at the end of their inward stroke and to urge said gripping mechanism outwardly when said second links are at the end of their outward stroke.

7. A parts handling machine as defined in claim 6 in which said gripping mechanism comprises a body, first and second opposed jaws, and means mounting said jaws on said body for movement between open and closed positions and for moving said jaws between said positions, said means comprising first and second levers connected to said first and second jaws, respectively, and mounted on said body to pivot about parallel axes, a reciprocating driver pivotally connected to said first lever and operable to pivot said first lever back and forth about its axis, and an equalizing link pivotally connected at one end to said first lever and at its opposite end to said second lever and operable to pivot said second lever in one direction and through a predetermined angular distance about its axis in response to pivoting of said first lever in the opposite direction and through the same angular distance about its axis.

8. A parts handling machine as defined in claim 7 in which said driver comprises the reciprocating rod of a fluid-operated actuator having a cylinder secured rigidly to said body in a stationary position.

9. A parts handling machine comprising a support, gripping mechanism for selectively picking up and releasing a part, and means mounting said gripping mechanism on said support to move upwardly, then generally horizontally and thence downwardly, said mounting means comprising a generally horizontal parallel linkage having an inner end pivotally mounted on said support to swing upwardly and downwardly, a generally vertical parallel linkage having a lower end pivotally connected to said gripping mechanism, a connector pivotally mounting the outer end of said horizontal linkage to swing upwardly and downwardly and pivotally mounting the upper end of said vertical linkage to swing inwardly and outwardly, a reaction surface on said connector, spring mechanism carried by said vertical linkage, said spring mechanism having an upper end biased upwardly against said reaction surface and having a lower end portion acting through said vertical linkage to bias said gripping mechanism downwardly, the upper end of said spring mechanism riding along said reaction surface of said vertical linkage is swung inwardly and outwardly, said reaction surface being shaped and located so as to cause said spring mechanism to urge said gripping mechanism inwardly when said vertical linkage is at the end of its inward stroke and to urge said gripping mechanism outwardly when said vertical linkage is at the end of its outward stroke, a first actuator for swinging said horizontal linkage upwardly and downwardly, and a second actuator for swinging said vertical linkage inwardly and outwardly, said second actuator swinging said vertical linkage inwardly and then outwardly as said first actuator swings said horizontal linkage, and said first actuator swinging said horizontal linkage upwardly and then downwardly as said second actuator swings said vertical linkage.

10. A parts handling machine comprising a support, gripping mechanism for selectively picking up and releasing a part, and means mounting said gripping mechanism on said support to move upwardly, then generally horizontally and thence downwardly, said mounting means comprising a first pair of generally horizontally extending and vertically spaced parallel links having inner end portions pivotally mounted on said support to swing upwardly and downwardly about generally horizontal axes, a second pair of generally vertically extending and horizontally spaced parallel links having lower end portions pivotally connected to said gripping mechanism to swing inwardly and outwardly about generally horizontal axes, a connector pivotally mounting the outer end portions of said first links to swing upwardly and downwardly about generally horizontal axes and pivotally mounting the upper end portions of said second links to swing inwardly and outwardly about generally horizontal axes, a first element having an upper end portion pivotally connected to the uppermost one of said first links, a second element telescoped slidably with said first element and having a lower end portion pivotally connected to the lowermost one of said first links, a spring telescoped over and compressed between said elements and urging said first and second elements upwardly and downwardly, respectively, to urge said first links away from one another, a first actuator for swinging said first links upwardly and downwardly, and a second actuator for swinging said second links inwardly and outwardly in timed relation with the swinging of said first links.

* * * * *